US008005438B2

(12) United States Patent
Chen

(10) Patent No.: US 8,005,438 B2
(45) Date of Patent: Aug. 23, 2011

(54) MULTIPLE FREQUENCY BAND WIRELESS TRANSCEIVER DEVICE AND RELATED DEVICES

(75) Inventor: Yung-Jinn Chen, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 471 days.

(21) Appl. No.: 12/196,296

(22) Filed: Aug. 22, 2008

(65) Prior Publication Data

US 2009/0153417 A1 Jun. 18, 2009

(30) Foreign Application Priority Data

Dec. 12, 2007 (TW) ............................... 96147401 A

(51) Int. Cl.
*H04B 1/44* (2006.01)

(52) U.S. Cl. ............. 455/78; 455/13.3; 455/82; 455/83; 343/702; 343/876

(58) Field of Classification Search ................. 455/13.3, 455/78, 82, 83, 560; 343/702, 879
See application file for complete search history.

(56) References Cited

U.S. PATENT DOCUMENTS

| | | | | |
|---|---|---|---|---|
| 7,596,357 | B2 * | 9/2009 | Nakamata et al. | 455/78 |
| 2005/0197095 | A1 | 9/2005 | Nakamata | |
| 2007/0004345 | A1 * | 1/2007 | Ono et al. | 455/78 |

* cited by examiner

*Primary Examiner* — Tuan H Nguyen
(74) *Attorney, Agent, or Firm* — Winston Hsu; Scott Margo

(57) ABSTRACT

A wireless signal transceiver device for receiving wireless signals of multiple frequency bands has an antenna, a radio frequency signal processing unit, an antenna switch module, a primary antenna matching circuit, and an auxiliary antenna matching module. The radio frequency signal processing unit outputs a control signal according to the frequency band of the wireless signal processed. The antenna switch module has a first signal terminal, and a plurality of second signal terminals coupled to the radio frequency signal processing unit, and switches a signal connection between the first signal terminal and one second signal terminal of the plurality of second signal terminals according to the control signal. The primary antenna matching circuit roughly matches the antenna, and the auxiliary antenna matching module matches the antenna with the primary antenna matching circuit based on the frequency band of the wireless signal processed by the radio frequency signal processing unit.

13 Claims, 11 Drawing Sheets

1:880.00000MHz/56.753 Ω/58.631 Ω/10.604 nH
2:915.00000MHz/73.434 Ω/-2.2241 Ω/78.205 pF
3:960.00000MHz/21.448 Ω/6.3501 Ω/1.0528nH
4:1.7100000GHz/18.884 Ω/1.7986 Ω/167.40pH
5:1.7938190GHz/51.126 Ω/9.9347 Ω/881.45pH
6:1.8821192GHz/26.995 Ω/-7.8874 Ω/10.721pF
7:1.9100000GHz/24.024 Ω/-660.12m Ω/126.23pF
8:1.9900000GHz/36.248 Ω/13.105 Ω/1.0481nH

MULTIPLE FREQUENCY BAND WIRELESS TRANSCEIVER DEVICE AND RELATED DEVICES

BACKGROUND OF THE INVENTION

1. Field of the Invention

The present invention relates to a wireless transceiver device, and more particularly, to a wireless transceiver device and related devices for providing optimal performance over wireless transmission powers, wireless reception sensitivities, and call current consumptions of different frequency bands.

2. Description of the Prior Art

With rapid development of wireless communications technologies, lightweight, convenient mobile phones have already dramatically altered the way people communicate with each other. Through use of mobile phones, people can conduct voice or data interaction anytime, anyplace. The prior art has already developed many different mobile communications systems according to different communications technologies, such as a Global System for Mobile Communications (GSM), a Code Division Multiple Access (CDMA) communications system, a Wideband Code Division Multiple Access (WCDMA) communications system, a Personal Digital Cellular (PDC) system, and a Personal Handyphone System (PHS), etc.

Generally speaking, different mobile communication systems do their best to avoid sharing operation frequency bands with all other communications systems. For example, GSM can be divided into 900 MHz, 1800 MHz, 850 MHz, and 1900 MHz GSM based on their respective operating frequency bands. The 900 MHz GSM (GSM900) performs reception in a frequency band from 925.2 MHz to 959.8 MHz, and transmission in a frequency band from 880.2 MHz to 914.8 MHz. The 1800 MHz GSM, or Digital Communication System (DCS1800) performs reception in a frequency band from 1805.2 MHz to 1879.8 MHz, and transmission in a frequency band from 1710.2 MHz to 1784.8 MHz. The 850 MHz GSM (GSM850) performs reception in a frequency band from 869 MHz to 894 MHz, and transmission in a frequency band from 824 MHz to 849 MHz. The 1900 MHz GSM, or Personal Communication System (PCS1900) performs reception in a frequency band from 1930 MHz to 1990 MHz, and transmission in a frequency band from 1850 MHz to 1910 MHz.

When designing a single-frequency mobile communications device, a designer may design a mobile communications device according to characteristics such as the operation frequency band, bandwidth, signal transmission and reception power, etc. of the corresponding mobile communications system. However, when the mobile communications device is capable of operating in multiple frequency bands corresponding to different mobile communications systems, more factors must be taken into account, and difficulty of the design increases. For example, in order to reduce size and cost of the mobile communications device, a multiple frequency band antenna will typically replace multiple single-frequency antennas. In this situation, achieving optimal voltage standing wave ratio (VSWR) or reflection coefficient for every frequency band becomes dramatically more difficult.

Please refer to FIG. 1, which is a diagram of a wireless radio frequency circuit 10 traditionally utilized in the GSM850, GSM900, DCS1800 and PCS1900 systems. The wireless radio frequency circuit 10 comprises an antenna 100, an antenna matching circuit 102, and an antenna switch module (ASM) 104. The ASM 104 is formed of a duplexer, switches, and filters, and is utilized for switching output of signals TX_GSM850, TX_GSM900, TX_DCS1800 and TX_PCS1900, or reception of signals RX_GSM850, RX_GSM900, RX_DCS1800 and RX_PCS1900 according to a control signal generated by a radio frequency signal processing unit (not shown in FIG. 1). The antenna matching circuit 102 is utilized for matching impedance of all frequency bands to an ideal 50 Ohms. In other words, taking a test point TP as a benchmark, the ASM 104 on the right half of the test point TP should be designed to 50 Ohms, and the antenna 100 and the antenna matching circuit 102 on the left half of the test point TP must achieve 50 Ohm impedance matching for each frequency band.

In the prior art, when designing the wireless radio frequency circuit 10, after finishing design of the radio frequency processing unit, the designer needs to insert the corresponding antenna 100 into the wireless radio frequency circuit 10, test the VSWR and reflection coefficient of the antenna 100 through a network analyzer, and then modify the shape of the antenna 100 and the characteristics of the antenna matching circuit 102 to achieve the optimal VSWR and reflection coefficient. Then, Total Radiation Power (TRP) and Total Isotropic Sensitivity (TIS) are tested in a 3D microwave darkroom to evaluate isotropic transmission and reception abilities of the mobile communications device.

Modifying the shape of the antenna 100 and the characteristics of the antenna matching circuit 102 according to the VSWR and reflection coefficient is a typical design flow. However, a tradeoff must necessarily occur when only one antenna and one antenna matching circuit are utilized in multiple frequency mobile communication devices of the prior art, making it difficult to meet the requirements for all frequency bands simultaneously. At the same time, impedance modification for low frequency bands and high frequency bands are often at ends with each other, making design difficult.

For example, please refer to FIGS. 2 and 3, which are a Smith diagram and VSWR diagram for a tri-band GSM antenna, utilized for the GSM900, DCS1800, and PCS1900 mobile communications systems. In FIGS. 2 and 3, frequency spectrums corresponding to points 1 to 3 belong to the GSM900 frequency band, points 4 to 6 belong to the DCS1800 frequency band, and points 6 to 8 belong to the PCS1900 frequency band. It can be seen from the VSWR diagram in FIG. 3 that GSM900 shows the narrowest band, DCS1800 the second narrowest, and PCS1900 a wider bandwidth. And from the Smith diagram in FIG. 2, it can be seen that the frequency points of GSM900 are distributed most broadly. In other words, for the narrowest bandwidth, the frequency points are spread widest, such that the low, mid, and high frequency TRP, TIS, and call current consumption in the GSM900 frequency band are harder to cover simultaneously.

Simply speaking, the major factor making design for multiple frequency bands in mobile communications devices difficult is severe limitation on the volume of the internal antenna, which causes a problem of insufficient bandwidth. Further, employment of only one antenna matching circuit to cover the needs of all frequency bands will never be sufficient, and performance in one or more frequency bands will suffer, and the optimum antenna impedance point for each frequency band is different, making it likely that each frequency band will exhibit narrow bandwidth. The impedance at some points is not even close to 50 Ohms, which also causes the problem of poor TRP and TIS. Thus, the wireless radio frequency characteristics in each frequency band are unable to be optimized. When the impedance adjustment tradeoff between low frequency bands and high frequency bands is added in, design difficulty increases even more.

SUMMARY OF THE INVENTION

According to an embodiment of the invention, a wireless signal transceiver device for receiving wireless signals of a plurality of frequency bands comprises an antenna, a radio frequency signal processing unit for processing the wireless signals of the plurality of frequency bands, and outputting a control signal according to the frequency band of the wireless signal processed, an antenna switch module comprising a first signal terminal and a plurality of second signal terminals, the plurality of second signal terminals coupled to the radio frequency signal processing unit, a primary antenna matching circuit coupled to the antenna for roughly matching the antenna, and an auxiliary antenna matching module coupled between the primary antenna matching circuit and the first signal terminal of the antenna switch module for matching the antenna with the primary antenna matching circuit according to the frequency band of the wireless signal processed by the radio frequency signal processing unit. The antenna switch module is utilized for switching a signal connection between the first signal terminal and one second signal terminal of the plurality of second signal terminals according to the control signal According to an embodiment of the invention, an antenna switch module utilized in a wireless signal transceiver device for switching wireless signals of a plurality of frequency bands comprises a first signal terminal coupled to a primary matching circuit of the wireless signal transceiver device for receiving the wireless signal from the primary matching circuit or outputting the wireless signal to the primary matching circuit, a plurality of second signal terminals coupled to a radio frequency signal processing unit of the wireless signal transceiver device for receiving signals from the radio frequency signal processing unit or outputting signals to the radio frequency signal processing unit, a switching module comprising a first terminal coupled to the first signal terminal, and a plurality of second terminals, for switching a signal connection between the first terminal and one second terminal of the plurality of second terminals according to the frequency band of the wireless signal processed by the radio frequency signal processing unit, a plurality of auxiliary antenna matching circuits coupled to the plurality of second terminals of the switching module, each of the plurality of auxiliary antenna matching circuits corresponding to one frequency band of the plurality of frequency bands, and a plurality of transceiver switching modules coupled between the plurality of auxiliary antenna matching circuits and the plurality of second signal terminals for switching receiving or transmitting of the wireless signal.

According to an embodiment of the invention, a wireless signal transceiver device for receiving and transmitting wireless signals of a plurality of frequency bands comprises an antenna, a radio frequency signal processing unit for processing the wireless signals of the plurality of frequency bands and outputting a control signal according to the frequency band of the wireless signal processed, a primary antenna matching circuit coupled to the antenna for roughly matching the antenna, and an antenna switch module coupled between the primary antenna matching circuit and the radio frequency signal processing unit. The antenna switch module comprises a first signal terminal coupled to the primary antenna matching circuit for receiving the wireless signals through the primary antenna matching circuit or outputting a signal to the primary antenna matching circuit, a plurality of second signal terminals coupled to the radio frequency signal processing unit for receiving signals through the radio frequency signal processing unit or outputting signals to the radio frequency signal processing unit, a switching module comprising a first terminal coupled to the first signal terminal, and a plurality of second terminals, for switching a signal connection between the first terminal and one second terminal of the plurality of second terminals according to the frequency band of the wireless signal processed by the radio frequency signal processing unit, a plurality of auxiliary antenna matching circuits coupled to the plurality of second terminals of the switching module, each of the plurality of auxiliary antenna matching circuits corresponding to one frequency band of the plurality of frequency bands for matching the antenna with the primary antenna matching circuit according to the frequency band of the wireless signal processed by the radio frequency signal processing unit, and a plurality of transceiver switching modules coupled between the plurality of auxiliary antenna matching circuits and the plurality of second signal terminals for switching receiving or transmitting of the wireless signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
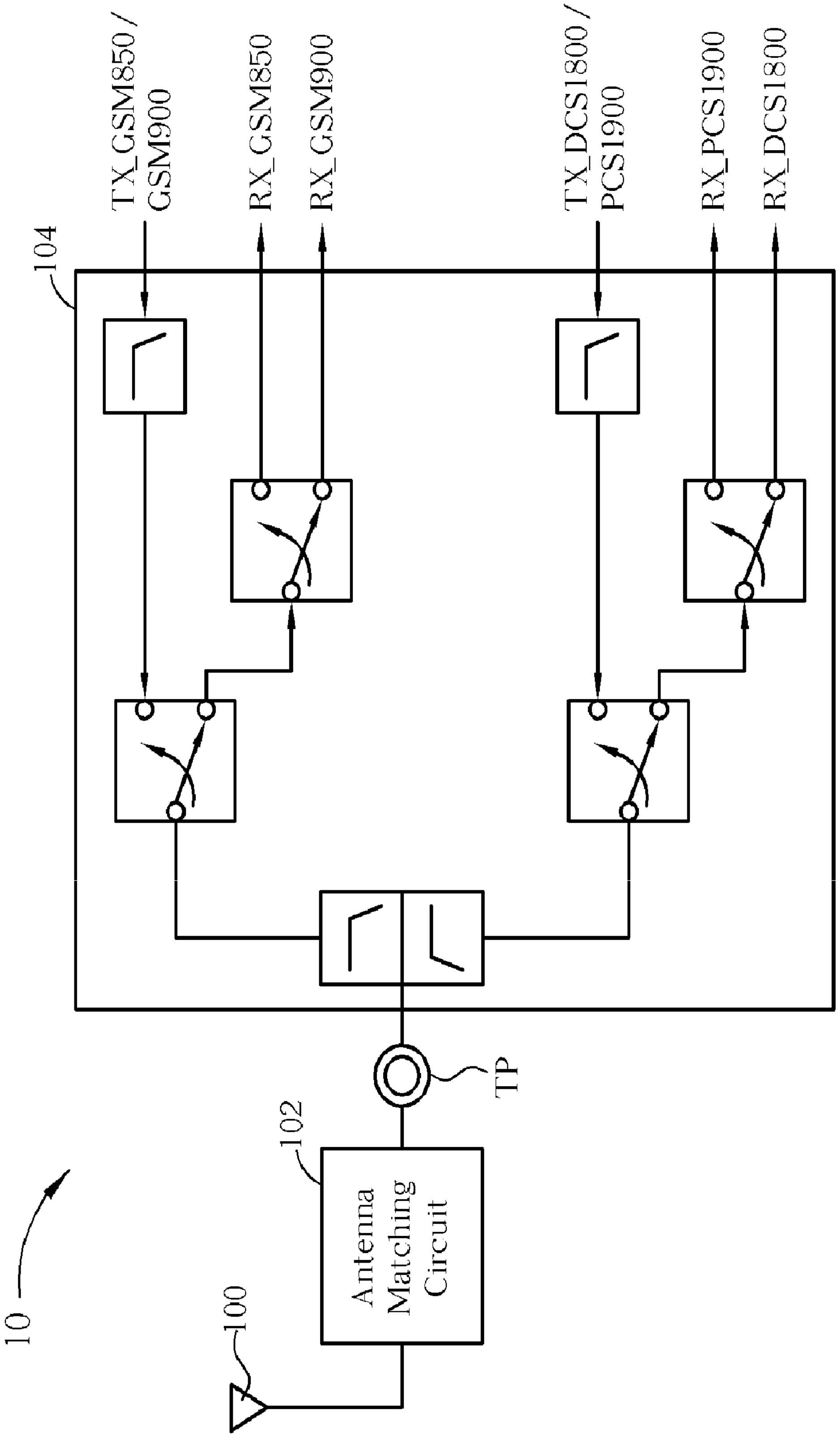
FIG. 1 PRIOR ART
FIG. 1 is a diagram of a wireless radio frequency circuit utilized in GSM850, GSM900, DCS1800, and PCS1900 systems.
Figure 2:
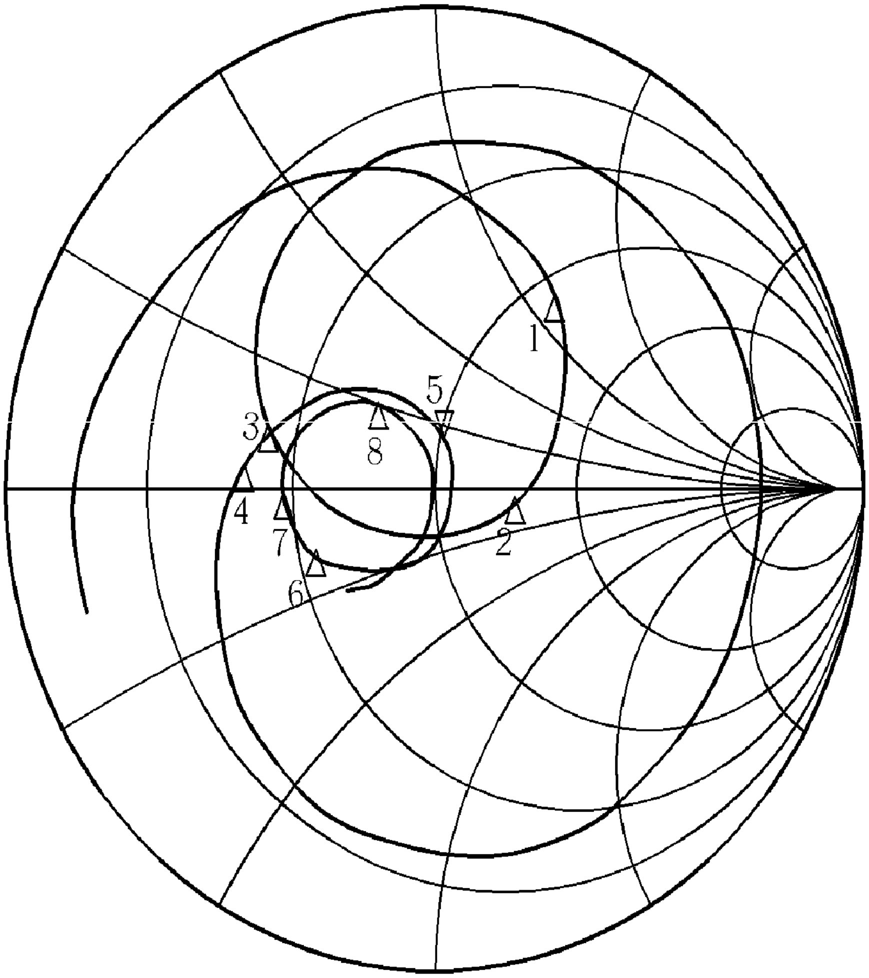
FIG. 2 PRIOR ART
FIG. 2 is a Smith diagram for a tri-band GSM antenna.
Figure 3:
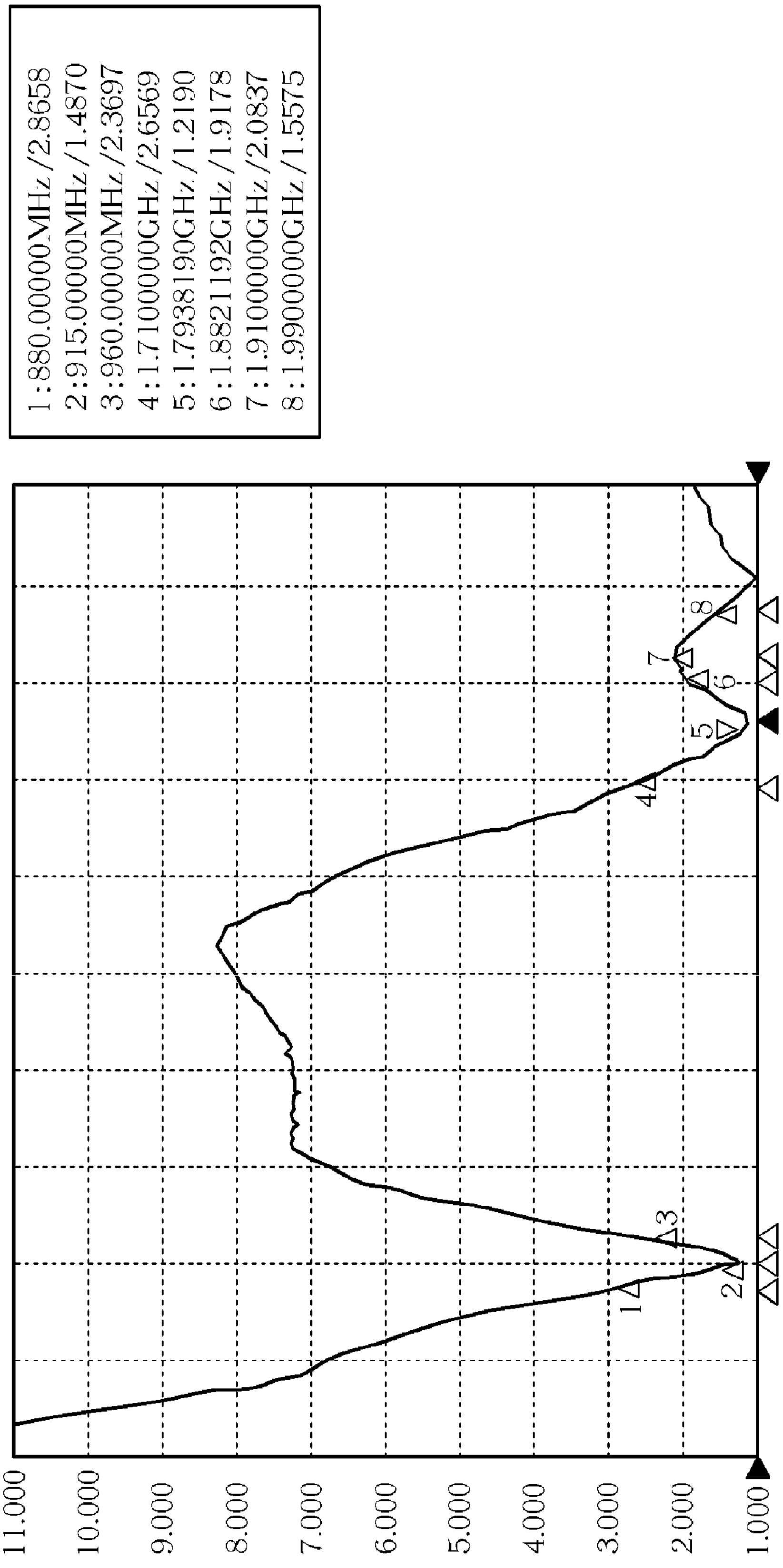
FIG. 3 PRIOR ART
FIG. 3 is a VSWR diagram for the tri-band GSM antenna.
Figure 4:
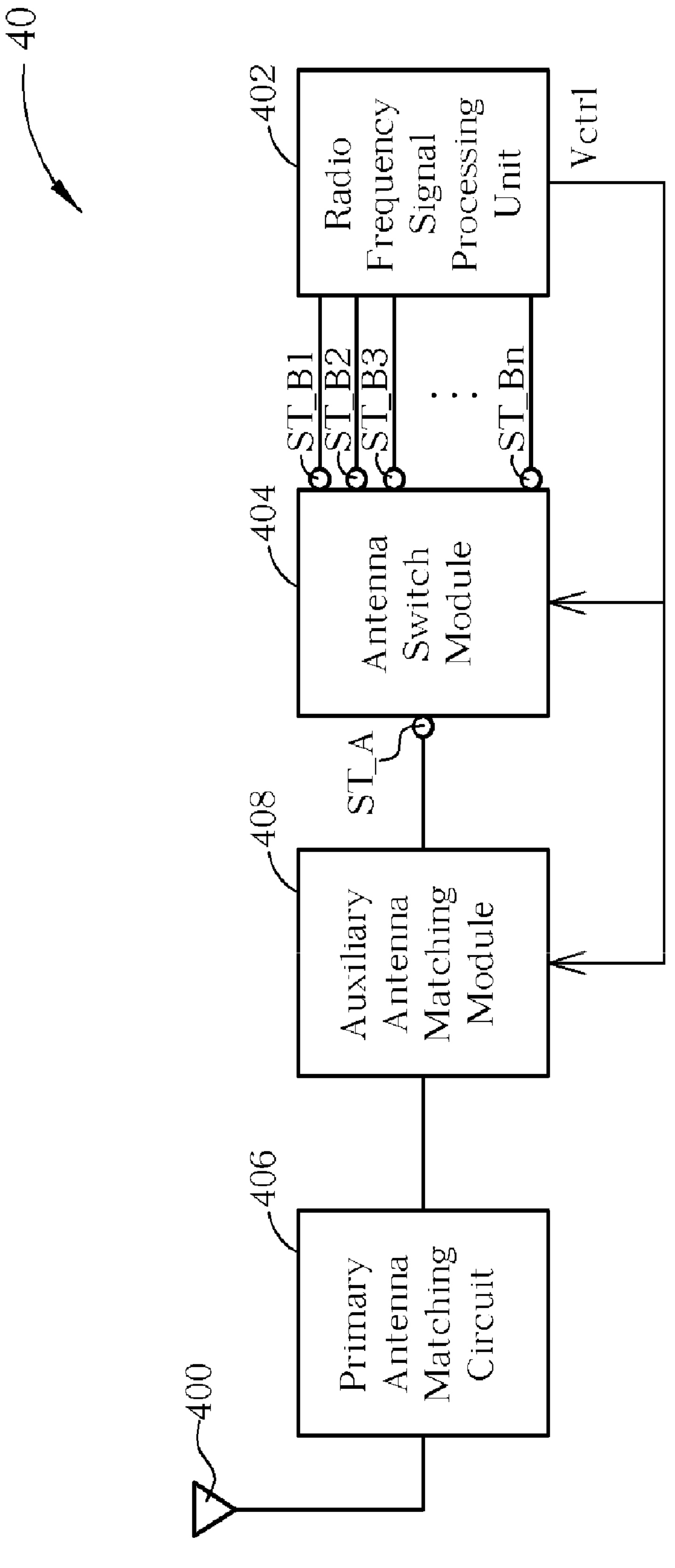
FIG. 4 is a diagram of a wireless signal transceiver device according to an embodiment of the invention.

Please refer to FIG. 4, which is a diagram of a wireless signal transceiver device 40 according to an embodiment of the invention. The wireless signal transceiver device 40 is utilized for receiving wireless signals of a plurality of frequency bands, and comprises an antenna 400, a radio frequency signal processing unit 402, an antenna switch module (ASM) 404, a primary antenna matching circuit 406, and an auxiliary antenna matching module 408. The antenna 400 is a multiple frequency band antenna utilized for receiving and transmitting wireless signals of different mobile communications systems. The radio frequency signal processing unit 402 is utilized for processing the wireless signals of the different mobile communications systems, and outputting a control signal Vctrl to the ASM 404 and the auxiliary antenna matching module 408 according to the frequency band of the wireless signal processed. The ASM 404 comprises signal terminals ST_A and ST_B1~ST_Bn coupled to the auxiliary antenna matching module 408 and the radio frequency signal processing unit 402 for switching a signal connection between the signal terminal ST_A and one signal terminal of the signal terminals ST_B1~ST_Bn. The primary antenna matching circuit 406 is coupled between the antenna 400 and the auxiliary antenna matching module 408 for roughly matching the antenna 400. The auxiliary antenna matching module 408 is coupled between the primary antenna matching circuit 406 and the signal terminal ST_A of the ASM 404 for finely matching the antenna 400 in coordination with the primary antenna matching circuit 406 according to the frequency band of the wireless signal processed by the radio frequency signal processing unit 402.

Thus, in the wireless signal transceiver device 40, the primary antenna matching circuit 406 is utilized for roughly matching the antenna 400, and the auxiliary antenna matching module 408 further coordinates with the primary antenna matching circuit 406 to perform fine matching of the antenna 400 based on the frequency band of the wireless signal processed by the radio frequency signal processing unit 402. In other words, the designer need only approximately match the impedance of the antenna 400 or modify the VSWR characteristics through the primary antenna matching circuit 406 when designing the wireless signal transceiver device 40, and may leave specific adjustment of the impedance and the VSWR characteristics of each frequency band to the auxiliary antenna matching module 408. In other words, the embodiment of the invention uses the primary antenna matching circuit 406 to realize first stage, rough tuning (similar to the prior art), then uses the auxiliary antenna matching module 408 to perform second-stage fine tuning across each different frequency band. In this way, design difficulty may be reduced dramatically.

Figure 5:
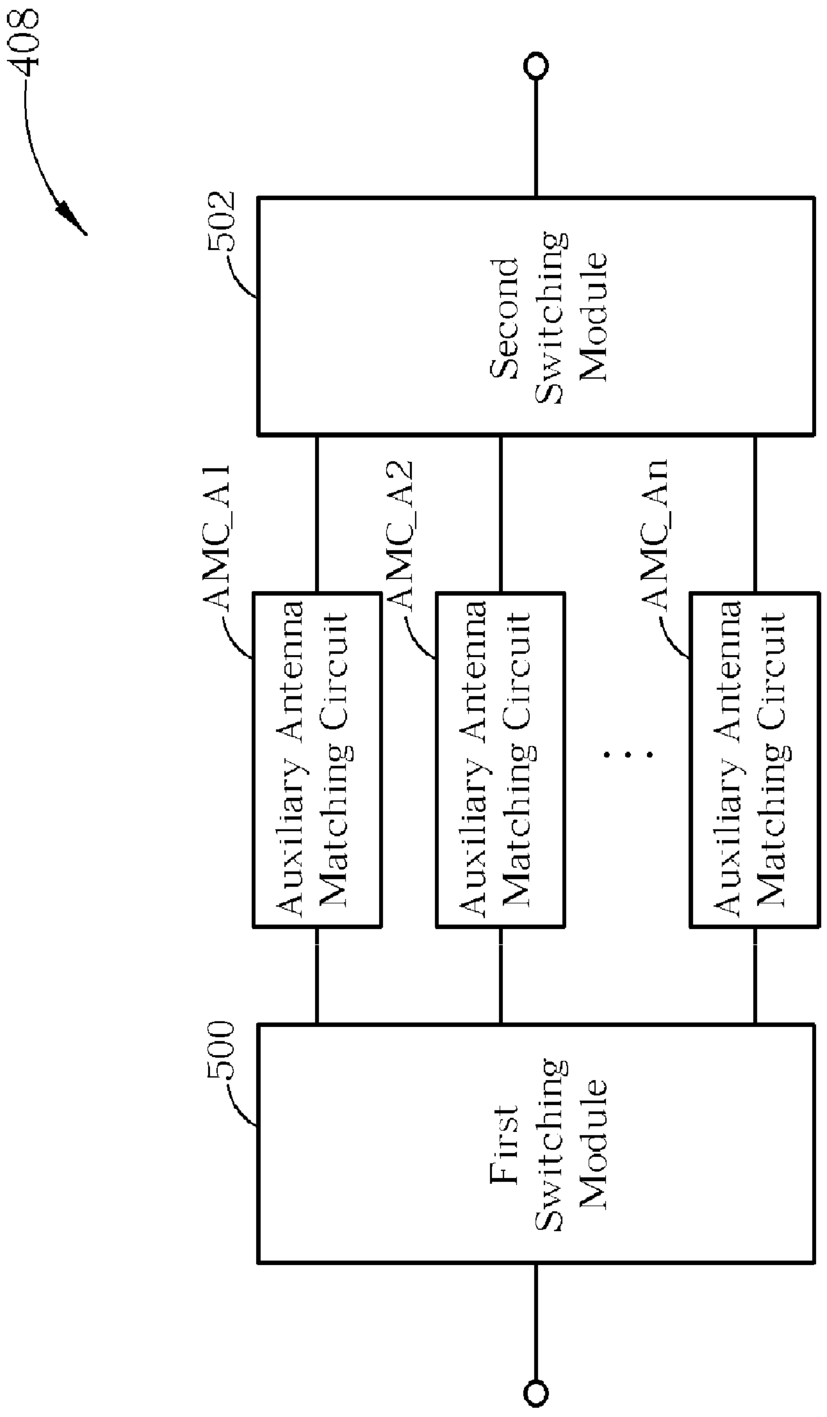
FIG. 5 is a diagram of an exemplary embodiment of an auxiliary antenna matching module of FIG. 4.

Please continue to refer to FIG. 5, which is a diagram of a embodiment of the auxiliary antenna matching module 408 of FIG. 4. The auxiliary antenna matching module 408 may comprise auxiliary antenna matching circuits AMC_A1~AMC_An, a first switching module 500, and a second switching module 502. Each of the auxiliary antenna matching circuits AMC_A1~AMC_An respectively corresponds to one frequency band of a plurality of preset frequency bands for matching the antenna 400 with the primary antenna matching circuit 406. The first switching module 500 is coupled between the primary antenna matching circuit 406 and the auxiliary antenna matching circuits AMC_A1~AMC_An for switching the primary antenna matching circuit 406 to couple to one auxiliary antenna matching circuit of the auxiliary antenna matching circuits AMC_A1~AMC_An according to the frequency band of the wireless signal processed by the radio frequency signal processing unit 402. Likewise, the second switching module 502 is coupled between the auxiliary antenna matching circuits AMC_A1~AMC_An and the signal terminal ST_A of the ASM 404 for switching a connection between one auxiliary antenna matching circuit of the auxiliary antenna matching circuits AMC_A1~AMC_An and the signal terminal ST_A of the ASM 404 according to the frequency band of the wireless signal processed by the radio frequency signal processing unit 402. Simply speaking, the first switching module 500 and the second switching module 502 route the primary antenna matching circuit 406 through a signal connection from a specific auxiliary antenna matching circuit to the signal terminal ST_A according to the frequency band of the wireless signal processed by the radio frequency signal processing unit 402. In this way, the auxiliary antenna matching module 408 may coordinate with the primary antenna matching circuit 406 according to the frequency band of the wireless signal processed by the radio frequency signal processing unit 402 to optimize the impedance matching and characteristics such as the VSWR.

Please note that the auxiliary antenna matching module 408 shown in FIG. 5 is an embodiment of the invention, but is not a limitation of the invention, as many modifications obvious to those knowledgeable of the art could be made. For example, a number of the auxiliary antenna matching circuits AMC_A1~AMC_An could be modified based on the frequency bands of the wireless signals processed by the radio frequency signal processing unit 402, or based on accuracy requirements needed by the designer. Analogously, the first switching module 500 and the second switching module 502 should be modified based on the number of the auxiliary antenna matching circuits AMC_A1~AMC_An. The four frequency bands, GSM850, GSM900, DCS1800, and PCS1900, are also used for illustrative purposes to show possible variations of the embodiment of the invention.

Figure 6:
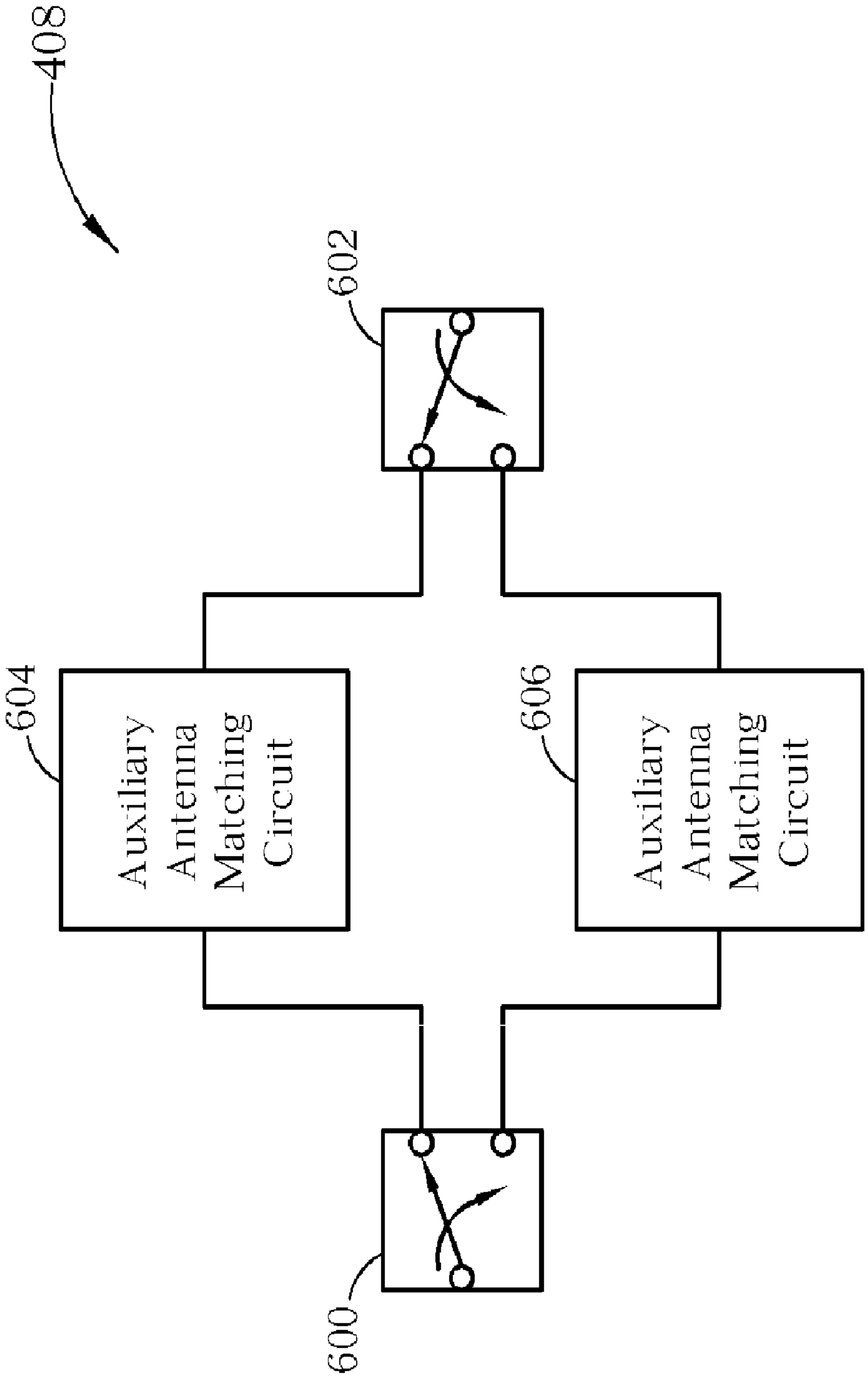
FIGS. 6 and 7 are diagrams of a realization of the auxiliary antenna matching module of FIG. 5 that utilizes two auxiliary antenna matching circuits.

First, when applied in the GSM850, GSM900, DCS1800 and PCS1900 systems, because the frequency bands for GSM850 and GSM900 are relatively close to each other, and the frequency bands for DCS1800 and PCS1900 are relatively close to each other, the auxiliary antenna matching module 408 may only include auxiliary antenna matching circuits 604 and 606, and the first switching module 500 and the second switching module 502 may be realized as switches 600 and 602, as shown in FIG. 6. In FIG. 6, the auxiliary antenna matching circuit 604 corresponds to the GSM850 and GSM900 frequency bands, and the auxiliary antenna matching circuit 606 corresponds to the DCS1800 and PCS1900 frequency bands. In this situation, when the radio frequency signal processing unit 402 processes GSM850 and GSM900 signals, the switches 600 and 602 should couple the primary antenna matching circuit 406 to the auxiliary antenna matching circuit 604, and should couple the auxiliary antenna matching circuit 604 to the signal terminal ST_A of the ASM 404. In this way, the auxiliary antenna matching circuit 604 may coordinate with the primary antenna matching circuit 406 to achieve optimal matching.

Figure 7:
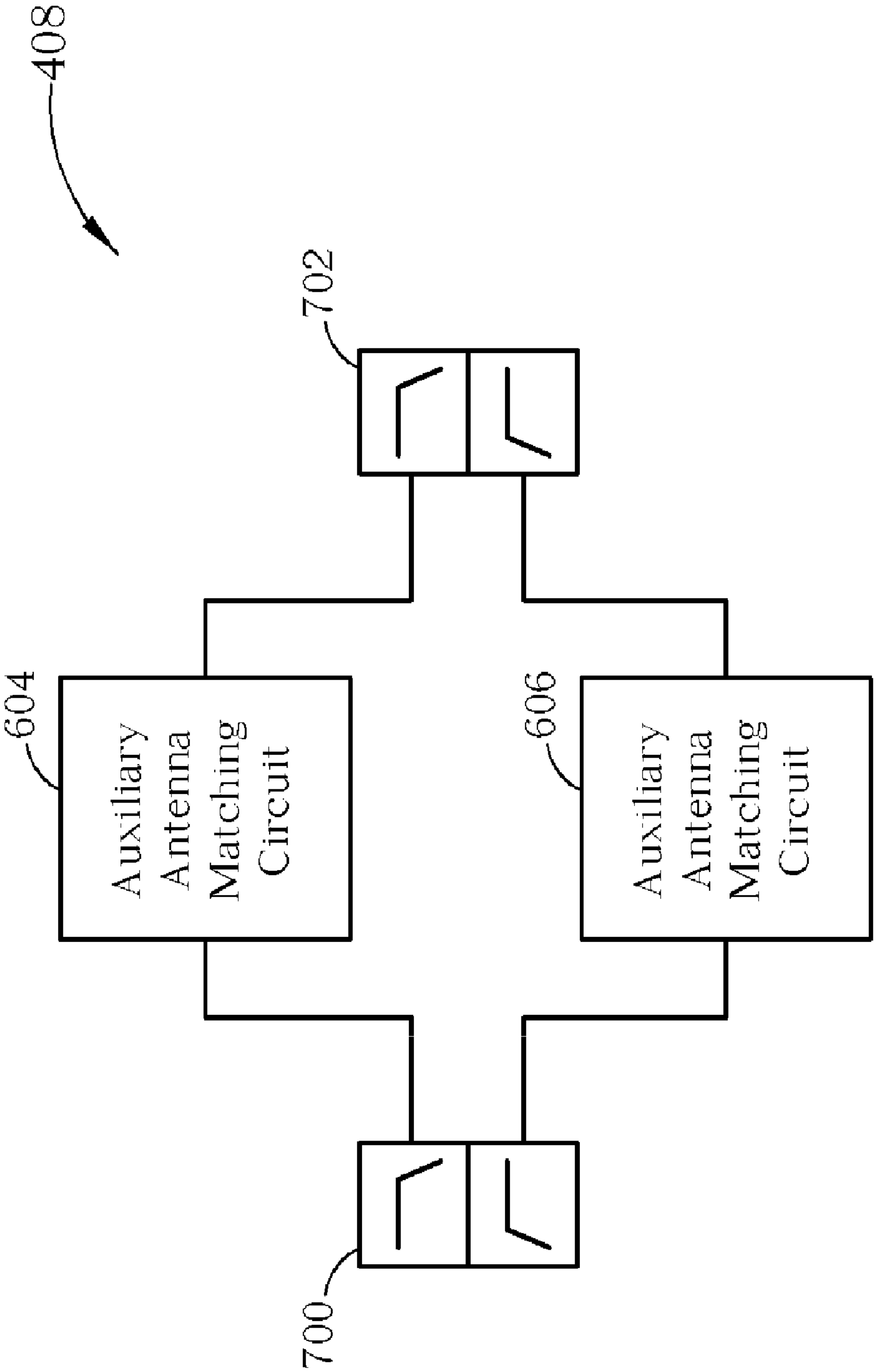

In addition, by comparing the GSM850, GSM900, DCS1800 and PCS1900 frequency bands, it can be seen that, compared to the DCS1800 and PCS1900 frequency bands, the GSM850 and GSM900 frequency bands are located at relatively low frequencies. Thus, the first switching module 500 and the second switching module 502 may be realized as duplexers 700 and 702, as shown in FIG. 7. The duplexers 700 and 702 are functionally similar to a combination of a low-pass filter and a high-pass filter, and may be utilized for selecting signals of a desired frequency band. In this situation, the duplexers 700 and 702 may automatically select an appropriate auxiliary antenna matching circuit according to the frequency band of the wireless signal processed by the radio frequency signal processing unit 402.

Figure 8:
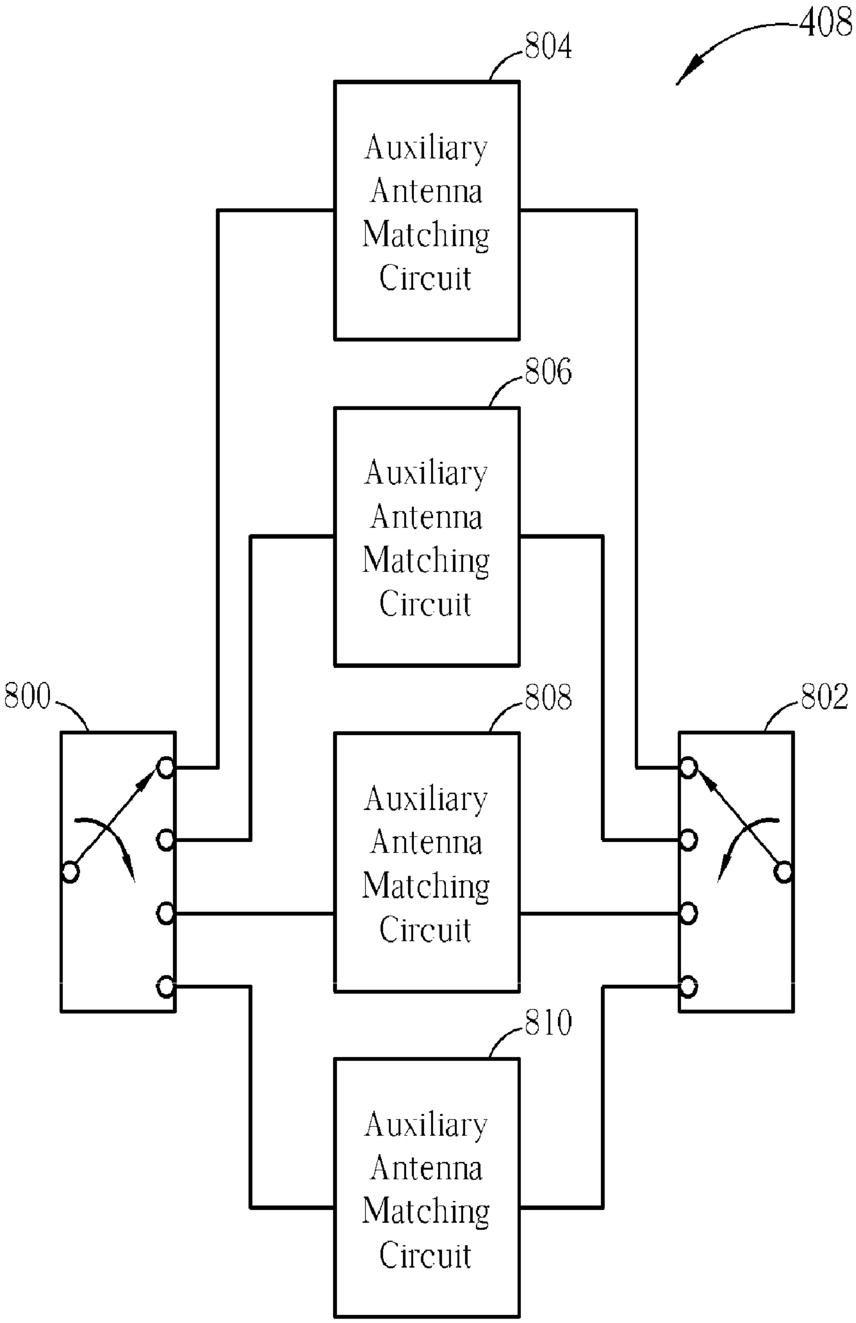
FIGS. 8 and 9 are diagrams of a realization of the auxiliary antenna matching module of FIG. 5 that utilizes four auxiliary antenna matching circuits.
Figure 9:
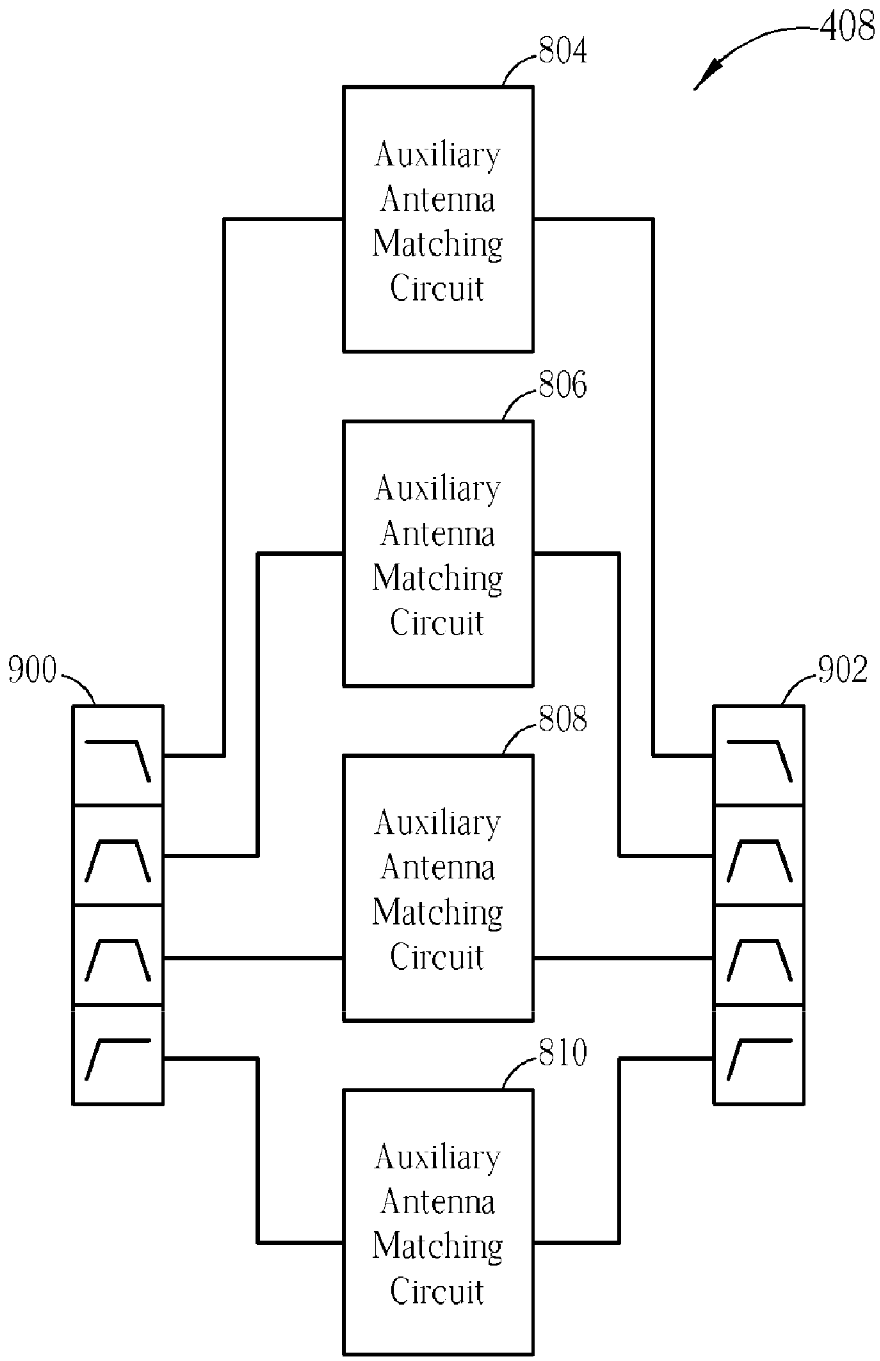

FIG. 6 and FIG. 7 illustrate utilization of two auxiliary antenna matching circuits 604 and 606 in coordination with the primary antenna matching circuit 406. Logically, the embodiment of the invention may also utilize four auxiliary antenna matching circuits in coordination with the primary antenna matching circuit 406 to improve accuracy. Please refer to FIGS. 8 and 9, which are diagrams of utilizing four auxiliary antenna matching circuits to realize the auxiliary antenna matching module 408. In FIGS. 8 and 9, the auxiliary antenna matching module 408 comprises auxiliary antenna matching circuits 804, 806, 808, 810, which respectively correspond to the GSM850, GSM900, DCS1800 and PCS1900 frequency bands. FIG. 8 and FIG. 9 differ in that the first switching module 500 and the second switching module 502 are realized by single pole, multiple throw switches 800 and 802 used for switching between multiple frequency bands in FIG. 8, whereas in FIG. 9, the first switching module 500 and the second switching module 502 are realized as multiplexers 900 and 902, which function similar to a combination of a low pass filter, a bandpass filter, and a high pass filter.

Thus, in the wireless signal transceiver device 40, the auxiliary antenna matching module 408 coordinates with the primary antenna matching circuit 406 to match the antenna 400 accurately according to the frequency band of the wireless signals processed by the radio frequency signal processing unit 402. In this way, the embodiment of the invention may utilize the primary antenna matching circuit 406 for first-stage rough tuning, then utilize the auxiliary antenna matching module 408 for second-stage fine tuning over the different frequency bands, so as to dramatically reduce design difficulty.

In FIG. 4, the auxiliary antenna matching module 408 is installed between the primary antenna matching circuit 406 and the ASM 404. The auxiliary antenna matching module 408 may optionally be formed within the ASM 404. Please refer to FIG. 10, which is a diagram of an ASM 110 according to the embodiment of the invention. The ASM 110 is utilized in a wireless signal transceiver device for switching wireless signals of a plurality of frequency bands, and comprises signal terminals ST_C and ST_D1~ST_Dn, a switching module 112, auxiliary antenna matching circuits AMC_B1~AMC_Bn, and transceiver switching modules RT_C1~RT_Cn. The signal terminal ST_C is formed in a primary matching circuit of the wireless signal transceiver device for receiving the wireless signals through the primary matching circuit or outputting signals to the primary matching circuit. The signal terminals ST_D1~ST_Dn are formed between a radio frequency signal processing unit and the transceiver switching modules RT_C1~RT_Cn of the wireless signal transceiver device, for receiving signals through the radio frequency signal processing unit or outputting signals to the radio frequency signal processing unit. The switching module 112 is coupled between the signal terminal ST_C and the auxiliary antenna matching circuits AMC_B1~AMC_Bn for switching coupling of the signal terminal ST_C to one auxiliary antenna matching circuit of the auxiliary antenna matching circuits AMC_B1~AMC_Bn according to the frequency band of the wireless signal processed by the radio frequency signal processing unit. The auxiliary antenna matching circuits AMC_B1~AMC_Bn are coupled between the switching module 112 and the transceiver switching modules RT_C1~RT_Cn, and each respectively corresponds to one frequency band of the plurality of frequency bands. The transceiver switching modules RT_C1~RT_Cn are coupled between the auxiliary antenna matching circuits AMC_B1~AMC_Bn and the signal terminals ST_D1~ST_Dn for switching receiving or transmitting of the wireless signals.

Simply speaking, the ASM 110 may be seen as an embodiment of the ASM 404 in which the auxiliary antenna matching module 408 of FIG. 4 has been moved into the ASM 404. Namely, the auxiliary antenna matching circuits AMC_B1~AMC_Bn correspond to the different frequency bands of the wireless signals, and are used in coordination with the primary antenna matching circuit to achieve optimal impedance matching and characteristics such as the VSWR across the different frequency bands.

Figure 10:
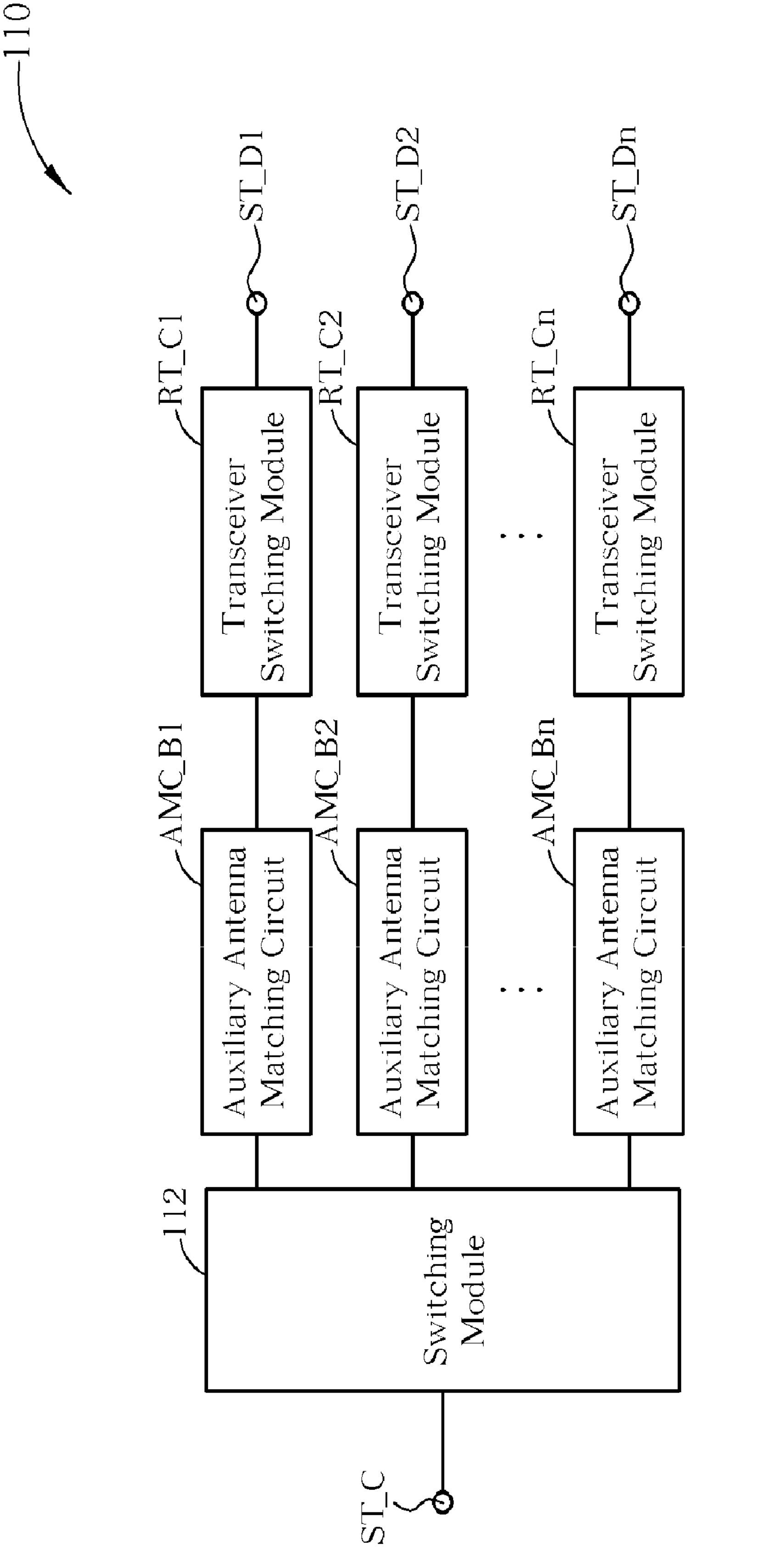
FIG. 10 is a diagram of an antenna switch module according to an embodiment of the invention.
Figure 11:
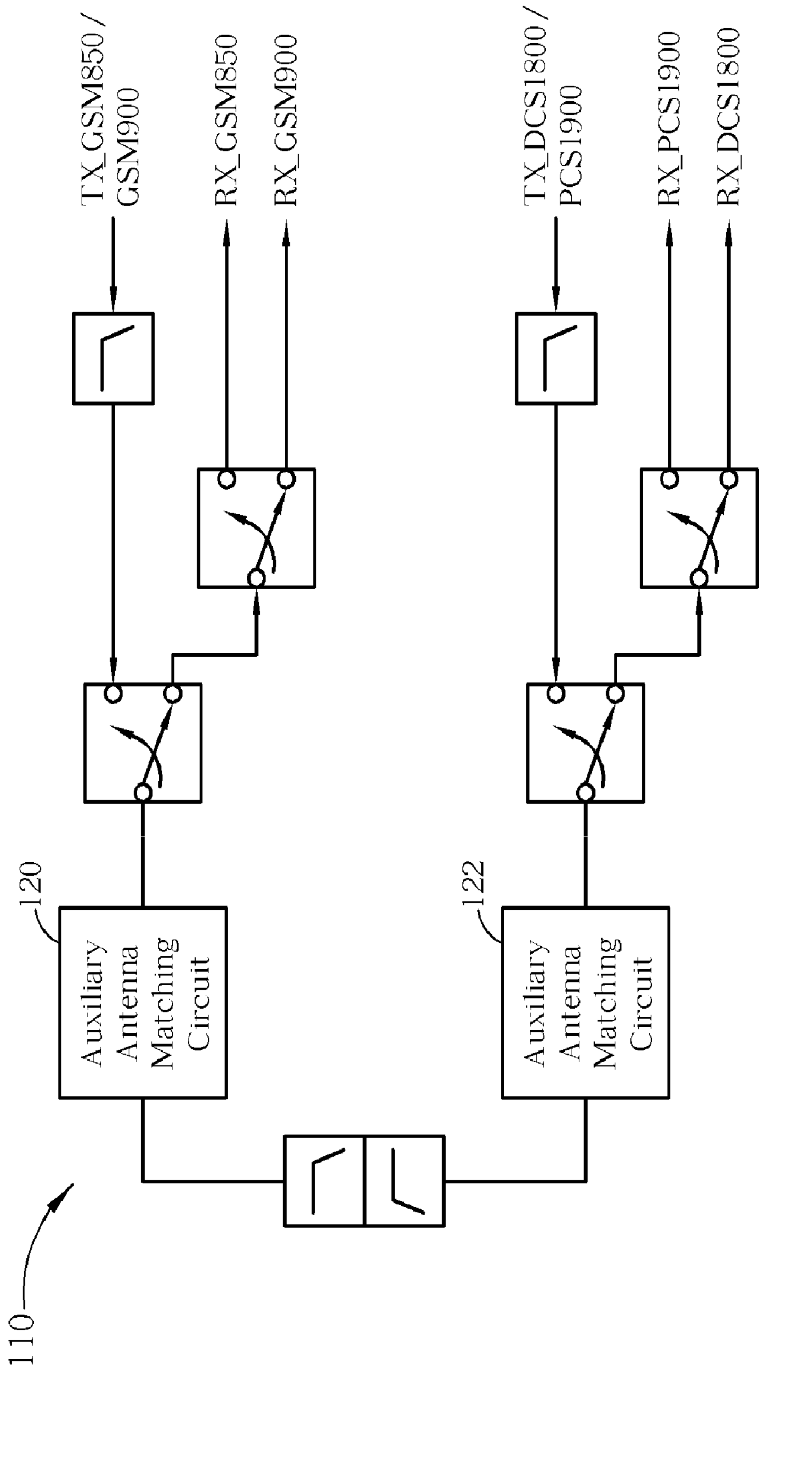
FIG. 11 is a diagram of a modification of the antenna switch module of FIG. 10.

FIG. 10 shows the embodiment of the ASM 110, but the ASM 110 is not limited to that shown in FIG. 10, as many modifications could possibly be made by those of normal skill in the art. For example, please refer to FIG. 11, which is a diagram of a second embodiment of the ASM 110. In FIG. 11, the ASM 110 is utilized in the GSM850, GSM900, DCS1800, and PCS1900 systems, an upper half corresponds to the GSM850 and GSM900 systems, and a lower half corresponds to the DCS1800 and PCS1900 systems. In this situation, the ASM 110 utilizes auxiliary antenna matching circuits 120 and 122 in coordination with the primary matching circuit, and the switching module 112 is realized as a duplexer. As the concepts are similar to the above, further description is omitted.

In conclusion, the embodiment of the invention utilizes the primary antenna matching circuit to realize first-stage, rough tuning, then utilizes the auxiliary antenna matching circuits to perform second-stage, fine tuning for each different frequency band. In this way, design difficulty is greatly reduced, and performance may be optimized in wireless transmission power, wireless reception sensitivity, and current consumption for each of the different frequency bands.

Those skilled in the art will readily observe that numerous modifications and alterations of the device and method may be made while retaining the teachings of the invention.

What is claimed is:

1. A wireless signal transceiver device for receiving wireless signals of a plurality of frequency bands, the wireless signal transceiver device comprising:

an antenna;

a radio frequency signal processing unit for processing the wireless signals of the plurality of frequency bands, and outputting a control signal according to the frequency band of the wireless signal processed;

an antenna switch module comprising a first signal terminal and a plurality of second signal terminals, the plurality of second signal terminals coupled to the radio frequency signal processing unit, wherein the antenna switch module is utilized for switching a signal connection between the first signal terminal and one second signal terminal of the plurality of second signal terminals according to the control signal;

a primary antenna matching circuit coupled to the antenna for roughly matching the antenna; and an auxiliary antenna matching module for matching the antenna with the primary antenna matching circuit according to the frequency band of the wireless signal processed by the radio frequency signal processing unit, comprising:

a plurality of auxiliary antenna matching circuits, wherein each of the plurality of auxiliary antenna matching circuits corresponds to one frequency band of the plurality of frequency bands for matching the antenna with the primary antenna matching circuit;

a first switching module coupled between the primary antenna matching circuit and the plurality of auxiliary antenna matching circuits for switching a connection between the primary antenna matching circuit and one auxiliary antenna matching circuit of the plurality of auxiliary antenna matching circuits according to the frequency band of the wireless signal processed by the radio frequency signal processing unit; and a second switching module coupled between the plurality of auxiliary antenna matching circuits and first signal terminal of the antenna switch module for switching a connection between the first signal terminal of the antenna switch module and one auxiliary antenna matching circuit of the plurality of auxiliary antenna matching circuits according to the frequency band of the wireless signal processed by the radio frequency signal processing unit.

2. The wireless signal transceiver device of claim 1, wherein the first switching module is a switch comprising a first terminal coupled to the primary antenna matching circuit, and a plurality of second terminals coupled to the plurality of auxiliary antenna matching circuits for switching a signal connection between the first terminal and one second terminal of the plurality of second terminals according to the control signal outputted by the radio frequency signal processing unit.

3. The wireless signal transceiver device of claim 1, wherein the second switching module is a switch comprising a plurality of first terminals coupled to the plurality of auxiliary antenna matching circuits, and an second terminal coupled to the first signal terminal of the antenna switch module for switching a signal connection between one first terminal of the plurality of first terminals and the second terminal according to the control signal outputted by the radio frequency signal processing unit.

4. The wireless signal transceiver device of claim 1, wherein the first switching module is a multiplexer comprising a plurality of filtering units respectively corresponding to the plurality of frequency bands for filtering out the wireless signals of the plurality of frequency bands.

5. The wireless signal transceiver device of claim 1, wherein the second switching module is a multiplexer comprising a plurality of filtering units respectively corresponding to the plurality of frequency bands for filtering out the wireless signals of the plurality of frequency bands.

6. The wireless signal transceiver device of claim 1, wherein the plurality of auxiliary antenna matching circuits has a number of 2.

7. The wireless signal transceiver device of claim 6, wherein the first switching module and the second switching module are both switches or duplexers.

8. The wireless signal transceiver device of claim 1, wherein the plurality of frequency bands correspond to 900MHz GSM, 1800MHz GSM, 850MHz GSM, and 1900MHz GSM.

9. A wireless transceiver device for receiving and transmitting wireless signals of a plurality of frequency bands, the wireless transceiver device comprising:

an antenna;

a radio frequency signal processing unit for processing the wireless signals of the plurality of frequency bands and outputting a control signal according to the frequency band of the wireless signal processed;

a primary antenna matching circuit coupled to the antenna for roughly matching the antenna; and an antenna switch module coupled between the primary antenna matching circuit and the radio frequency signal processing unit, the antenna switch module comprising:

a first signal terminal coupled to the primary antenna matching circuit for receiving the wireless signals through the primary antenna matching circuit or outputting a signal to the primary antenna matching circuit;

a plurality of second signal terminals coupled to the radio frequency signal processing unit for receiving signals through the radio frequency signal processing unit or outputting signals to the radio frequency signal processing unit;

a switching module comprising a first terminal coupled to the first signal terminal, and a plurality of second terminals, for switching a signal connection between the first terminal and one second terminal of the plurality of second terminals according to the frequency band of the wireless signal processed by the radio frequency signal processing unit;

a plurality of auxiliary antenna matching circuits coupled to the plurality of second terminals of the switching module, each of the plurality of auxiliary antenna matching circuits corresponding to one frequency band of the plurality of frequency bands for matching the antenna with the primary antenna matching circuit according to the frequency band of the wireless signal processed by the radio frequency signal processing unit; and a plurality of transceiver switching modules coupled between the plurality of auxiliary antenna matching circuits and the plurality of second signal terminals for switching receiving or transmitting of the wireless signals.

10. The wireless transceiver device of claim 9, wherein the switching module is a multiplexer comprising a plurality of filtering units respectively corresponding to the plurality of frequency bands for filtering out the wireless signals of the plurality of frequency bands.

11. The wireless transceiver device of claim 9, wherein the plurality of auxiliary antenna matching circuits have a number of 2.

12. The wireless transceiver device of claim 11, wherein the switching module is a duplexer.

13. The wireless transceiver device of claim 9, wherein the plurality of frequency bands correspond to 900MHz GSM, 1800MHz GSM, 850MHz GSM, and 1900MHz GSM.

* * * * *